US011881935B2

(12) United States Patent
Nandakumaran et al.

(10) Patent No.: US 11,881,935 B2
(45) Date of Patent: Jan. 23, 2024

(54) REDUCING A NETWORK DEVICE UPGRADE OUTAGE USING A REDUCED HARDWARE RESOURCE SCALING

(71) Applicant: Arista Networks, Inc., Santa Clara, CA (US)

(72) Inventors: Purushothaman Nandakumaran, Milpitas, CA (US); Joseph Olakangil, San Jose, CA (US); Lakshmikanth Chowdary Pothula, Santa Clara, CA (US); Swaroop George, Bangalore (IN)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 17/684,930

(22) Filed: Mar. 2, 2022

(65) Prior Publication Data
US 2023/0283574 A1 Sep. 7, 2023

(51) Int. Cl.
*H04L 12/70* (2013.01)
*H04L 47/70* (2022.01)
*H04L 47/762* (2022.01)
*G06F 8/65* (2018.01)
*H04L 47/78* (2022.01)

(52) U.S. Cl.
CPC .............. *H04L 47/828* (2013.01); *G06F 8/65* (2013.01); *H04L 47/762* (2013.01); *H04L 47/781* (2013.01); *H04L 47/829* (2013.01)

(58) Field of Classification Search
CPC ... H04L 47/828; H04L 47/762; H04L 47/781; H04L 47/829; G06F 8/65
USPC .......................................................... 709/226
See application file for complete search history.

(56) References Cited

U.S. PATENT DOCUMENTS

| 9,049,148 B1* | 6/2015 | Singh ...................... H04L 45/54 |
| 2009/0161578 A1* | 6/2009 | Yeung ..................... H04L 45/00 370/254 |
| 2022/0131808 A1* | 4/2022 | Xie ........................ H04L 45/021 |
| 2022/0337507 A1* | 10/2022 | Davey ................. H04L 41/0816 |
| 2022/0407806 A1* | 12/2022 | Hu ......................... H04L 61/103 |

* cited by examiner

*Primary Examiner* — Ario Etienne
*Assistant Examiner* — Elizabeth Kassa
(74) *Attorney, Agent, or Firm* — Tianyi He

(57) ABSTRACT

In general, embodiments relate to a method, for managing a network device, that includes accessing, by a feature agent of the network device, an allocation data structure, wherein the allocation data structure specifies a first portion of memory and a second portion of memory, identifying, using the allocation data structure, the first portion of the memory to be used during an upgrade, wherein the second portion of memory is used for storing a network device table, wherein the network device table is used by a packet transmission component while the upgrade is being performed, and upon completion of the upgrade, updating the allocation data structure to specify that the packet transmission component use a second network device table and stop using the network device table, wherein the second network device table is initially populated during the upgrade.

19 Claims, 7 Drawing Sheets

REDUCING A NETWORK DEVICE UPGRADE OUTAGE USING A REDUCED HARDWARE RESOURCE SCALING

BACKGROUND

Network devices in a network may include functionality for transmitting packets between each other and other devices in a network. The transmission of packets may require the use of configuration information for configuring the hardware of the network device to transmit the packets in accordance with predefined rules.

DETAILED DESCRIPTION

Figure 1A:
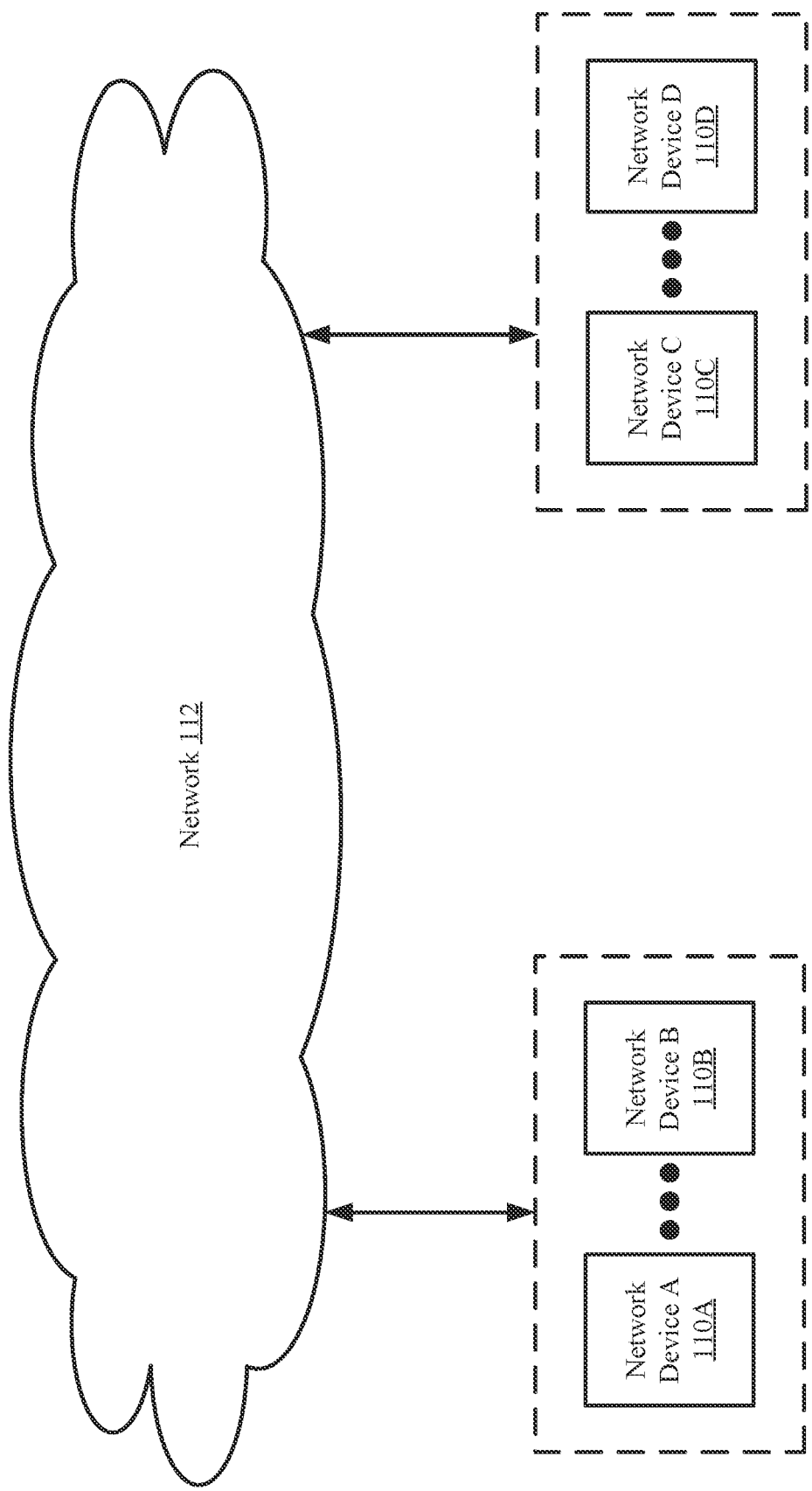
FIG. 1A shows a diagram of a system in accordance with one or more embodiments.

Network devices utilize any number of network device tables (e.g., routing tables, forwarding tables, etc.) to perform the functionality of the network devices. The network device tables may be populated, read from, and/or otherwise utilized by, for example, hardware resources such as, for example, forwarding chips. The forwarding chips may be implemented as application specific integrated circuits (ASICs). Further, different network device tables may be used depending on the network layer (e.g., layer 2 (L2), layer 3 (L3)) in which the network device operates. The network device tables may be stored in memory. For example, the network devices may utilize memory banks of the hardware resources.

During an operational lifecycle of a network device, the control plane (or any other software operating on the network device) may undergo any number of upgrades to a newer version. The upgrade may take some time to complete. In traditional implementations, the operability of the network device may be highly limited while an upgrade is in progress.

Specifically, during an upgrade, state information is generated (e.g., by a processor or by a network device agent of the network device) using communication with peer network devices and/or any static configuration obtained from an administrator (e.g., a user) of the network device. For example, the network device agent of the network device that executes the upgrade may store, in hardware memory, forwarding information based on configuration information of the hardware resources (e.g., the forwarding chips) and based on the communication performed with the peer network devices. The forwarding information is to be used for the upgrade to be used for transmitting packets. The configuration information may further include a new iteration of network device tables. Following the download of the state information to memory, the upgrade agent may notify the forwarding chips to initiate the upgrades on the respective hardware using the state information and, once complete, utilize the new iterations of network device tables. In traditional implementations, during the download of the configuration information, the forwarding chips (or other packet transmission components) may not be capable of performing packet transmission, as all of the memory is dedicated for the download. This may result in undesired latency in operation of the network device.

To reduce the traffic outage caused by the completion of an upgrade, embodiments include methods and systems for reducing the scale of the hardware resources provided to store the network device tables such that only a portion of the hardware resources (e.g., the memory banks) are used for storage of the network device tables. A second portion of the memory banks may be used for the execution of the upgrade (e.g., which may include downloading the configuration information to the second portion of memory). In this manner, during execution, each of the aforementioned portions may be utilized by the respective network device agents and/or forwarding chips, thus reducing the waiting done by the network device agents and/or forwarding chips. While embodiments refer to utilizing two portions of the network device tables, the scale of the network device tables may be reduced to any number of portions.

The execution of the upgrade may include generating and populating a second iteration of network device tables. However, to reduce the latency caused by waiting for the upgrade to be completed, the other network device agents may continue to use the previous iterations of the network device tables stored in the aforementioned portions. Following the completion of the upgrade, the forwarding chips may be instructed to switch from utilizing the previous iteration of network device tables to utilizing the second iteration of network device tables.

To facilitate the provisioning of the hardware resources between the first portions and the second portions, a feature agent may be introduced to determine the portions to be allocated between the execution of the upgrade and the utilization of the network device tables by the forwarding chips. Further, the feature agent manages the rerouting of usage by the network device agents from one portion to another during or after each new SSU. To manage the allocation, an allocation data structure may be stored that specifies the portion(s) of the memory banks allocated to the network device tables and the portion(s) allocated to the completion of the upgrade. The allocation data structure may be stored in persistent storage (e.g., a hard drive, flash memory, solid state drive, etc.) or volatile memory (e.g., random access memory (RAM), etc.) without departing from this disclosure.

For example, for network device agents implementing a L3 networking functionality, the forwarding tables and/or routing tables may be allocated in the first two out of the four available memory banks. The second two memory banks may be untouched until an upgrade is initiated. During the upgrade, the network device agent executing the upgrade may read the aforementioned data structure to identify its allocated portion(s), and execute the upgrade using the allocated portion(s). During the upgrade, the network device agent may generate second forwarding tables and populate the two memory banks belonging to the second portion with the second tables. Following completion of the upgrade, the feature agent may update the allocation data structure to specify that the hardware resources stop utilizing the forwarding tables and routing tables of the first two memory banks and to utilize the new tables stored in the second two memory banks.

While embodiments discuss the data structure specifying the memory banks to be utilized, the allocation may be specified on a network device agent level. For example, instead of specifying the memory banks allocated to the storage of network device tables, the data structure may specify the agents that are allocated to each memory bank.

FIG. 1A shows a system in accordance with one or more embodiments of the disclosure. As shown in FIG. 1A, the system includes a network (112) that includes one or more network devices (110A, 110B, 110C, 110D). Each of these components is operatively connected via any combination of wired and/or wireless connections without departing from the disclosure. The system may include additional, fewer, and/or different components without departing from the disclosure. Each of the aforementioned components illustrated in FIG. 1A is described below.

In one or more embodiments, each of the network devices (e.g., 110A, 110B, 110C, 110D) includes functionality to receive packets at any of the physical network interfaces (e.g., ports) of the network device (further discussed in FIG. 1B) and to process the packets. In one or more embodiments, the network device includes functionality for transmitting packets between network devices (110A, 110B, 110C, 110D) and/or between components in a network device (110A, 110B, 110C, 110D). The process of receiving packets, processing the packets, and transmitting the packets may be in accordance with, at least in part, FIGS. 2A-2C.

In one embodiment of the disclosure, the one or more network device(s) (110A, 110B, 110C, 110D) are physical devices (not shown) that include persistent storage, memory (e.g., random access memory), one or more processor(s), network device hardware (including a switch chip(s), line cards, etc.), and two or more physical ports. In one embodiment of the disclosure, the network device is hardware that determines which egress port on a network device to forward media access control (MAC) frames. Each physical port (further discussed in FIG. 1B) may or may not be connected to another device (e.g., a client device, another network device) on the network (112). The network device (or more specifically the network device hardware) may be configured to receive packets via the ports and determine whether to: (i) drop the packet; (ii) process the packet in accordance with one or more embodiments of the disclosure; and/or (iii) send the packet, based on the processing, out from another port on the network device. While the aforementioned description is directed to network devices that support Ethernet communication, the disclosure is not limited to Ethernet; rather, the disclosure may be applied to network devices using other communication protocols. For additional details regarding a network device (e.g., 110A, 110B, 110C, 110D), see, e.g., FIG. 1B.

Figure 1B:
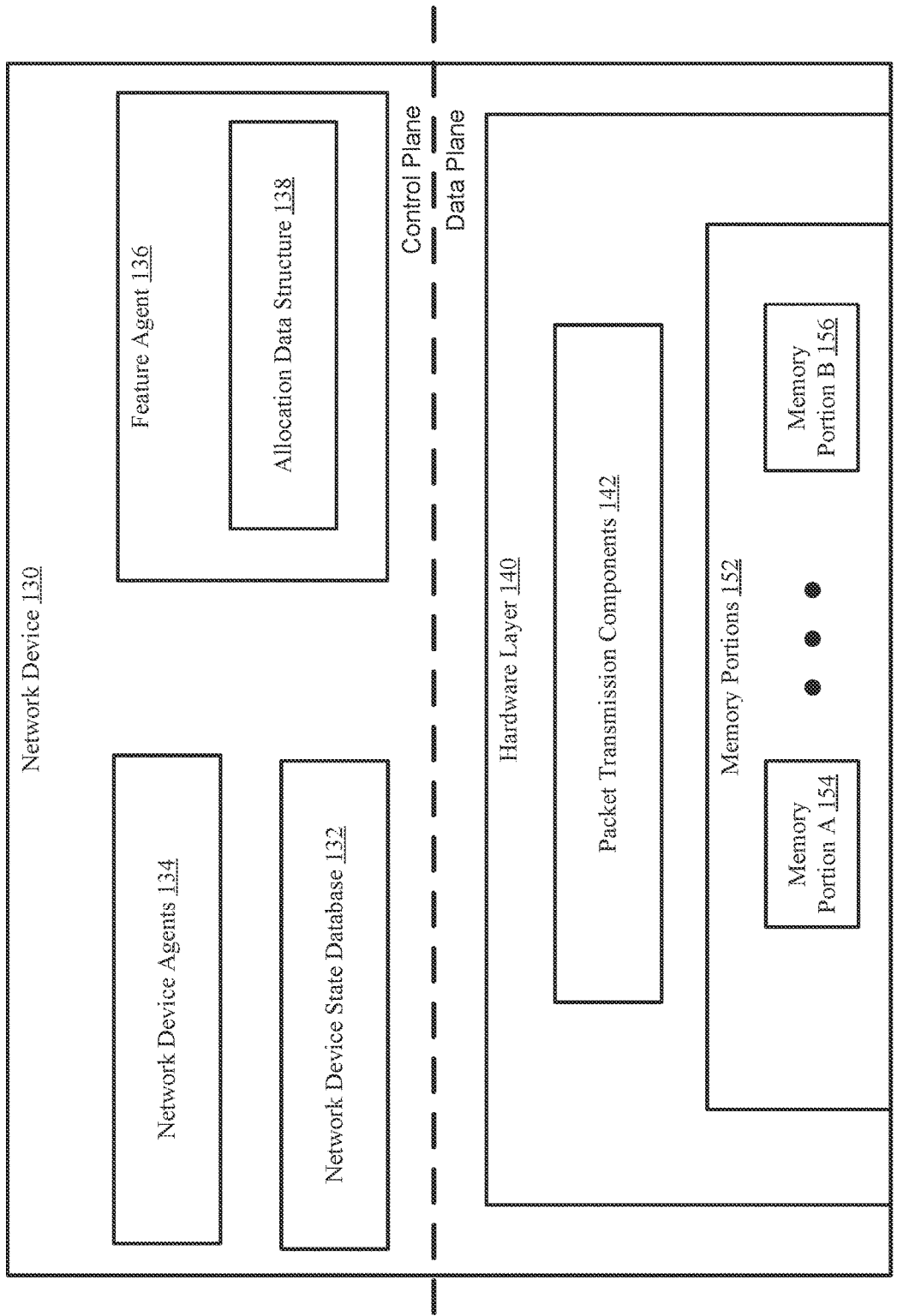
FIG. 1B shows a diagram of a network device in accordance with one or more embodiments.

FIG. 1B shows a diagram of a network device in accordance with one or more embodiments of the disclosure. The network device (130) may be an embodiment of a network device (e.g., 110A, FIG. 1A) discussed above. As discussed above, the network device (130) may include functionality for transmitting packets between network devices. To perform the aforementioned functionality, the network device (130) includes a network device state database (132), one or more network device agents (134), feature agent (136), and a hardware layer (140). The network device (130) may include additional, fewer, and/or different components without departing from the disclosure. Each of the aforementioned components illustrated in FIG. 1B is described below.

In one embodiment of the disclosure, the network device state database (132) includes the current state of the network device (130). The state information stored in the network device state database (132) may include, but is not limited to: (i) information about (and/or generated by) all (or a portion thereof) services currently executing on the network device; (ii) the version of all (or a portion thereof) software executing on the network device; (iii) the version of all firmware on the network device; (iv) hardware version information for all (or a portion thereof) hardware in the network device; (v) information about the current state of all (or a portion thereof) tables (e.g., routing table, forwarding table, etc.) in the network device that are used to process packets, where information may include the current entries in each of the tables, and (vi) information about all (or a portion thereof) services, protocols, and/or features configured on the network device (e.g., show command service (SCS), MLAG, LACP, VXLAN, LLDP, tap aggregation, data center bridging capability exchange, ACL, VLAN, VRRP, VARP, STP, OSPF, BGP, RIP, BDF, MPLS, PIM, ICMP, IGMP, etc.), where this information may include information about the current configuration and status of each of the services, protocols, and/or features. In one embodiment of the disclosure, the network device state database (132) includes control plane state information associated with the control plane of the network device. Further, in one embodiment of the disclosure, the state database includes data plane state information (discussed above) associated with the data plane of the network device. The network device state database (132) may include other information without departing from the disclosure.

In one embodiment of the disclosure, the network device state database (132) may be implemented using any type of database (e.g., a relational database, a distributed database, etc.). Further, the network device state database (132) may be implemented in-memory (i.e., the contents of the state database may be maintained in volatile memory). Alternatively, the network device state database (132) may be implemented using persistent storage. In another embodiment of the disclosure, the network device state database (132) may be implemented as an in-memory database with a copy of the state database being stored in persistent storage. In such cases, as changes are made to the in-memory database, copies of the changes (with a timestamp) may be stored in persistent storage. The use of an in-memory database may provide faster access to the contents of the network device state database (132).

Those skilled in the art will appreciate that while the term "database" is used above, the network device state database (132) may be implemented using any known or later developed data structure(s) to manage and/or organize the content in the state database.

In one embodiment of the disclosure, the network device (130) further includes one or more network device agents (134). The network device agents (134) interact with the network device state database (132). Each network device agent (134) facilitates the implementation of one or more protocols, services, and/or features of the network device (130). Examples of network device agents, include, but are not limited to, a routing information base agent, a forwarding information base agent, and a simple network management protocol (SNMP) agent. Furthermore, each network device agent includes functionality to access various portions of the network device state database (132) in order to obtain the relevant portions of the state of the network device (130) in order to perform various functions. Additionally, each network device agent includes functionality to update the state of the network device (130) by writing new and/or updated values in the network device state database (132), corresponding to one or more variables and/or parameters that are currently specified in the network device (130). In one or more embodiments, the network device agents (134) may not be aware of any partitioning of the memory portions (152) (further discussed below). While embodiments disclosed herein describe network device agents (134) that do not utilize the hardware layer (140) and/or the partitionings of the memory portions (152), other embodiments may be implemented in which, for example, the network device agents (134) utilize one or more of the partitionings of the memory portions (152).

In one or more embodiments, the network device agents (134) include functionality for performing upgrades. The upgrades may refer to processes for updating the version of the control plane that is used to manage the transmission of packets between network devices and the network device (130). For example, the upgrades may be performed in response to a user (e.g., an administrator) initiating the upgrade on one or more network devices. As a second example, the upgrade may be performed in response to an upgrade policy implemented by the network device agent (134) that specifies a schedule for initiating the upgrade.

In one or more embodiments disclosed herein, the feature agent (136) manages the usage of memory portions (152) in the hardware layer (140). To manage the usage, the feature agent (136) utilizes an allocation data structure (138) that includes information relating to the allocation of the memory portions for data transmission and/or for completing an upgrade. The allocation data structure (138) may specify the memory portion (e.g., 154, 156) that is allocated to the packet transmission components (142) for performing their respective functionality (discussed below). Further, the allocation data structure (138) may specify the memory portion(s) (e.g., 154, 156) that is allocated to the completion of an upgrade performed by the network device agents (134).

In one or more embodiments disclosed herein, the feature agent (136) is a physical device. The physical device may include circuitry. The physical device may be, for example, a field-programmable gate array, application specific integrated circuit, programmable processor, microcontroller, digital signal processor, or other hardware processor. The physical device may be adapted to provide, at least partly, the functionality of the feature agent (136) described throughout this application.

Figure 2A:
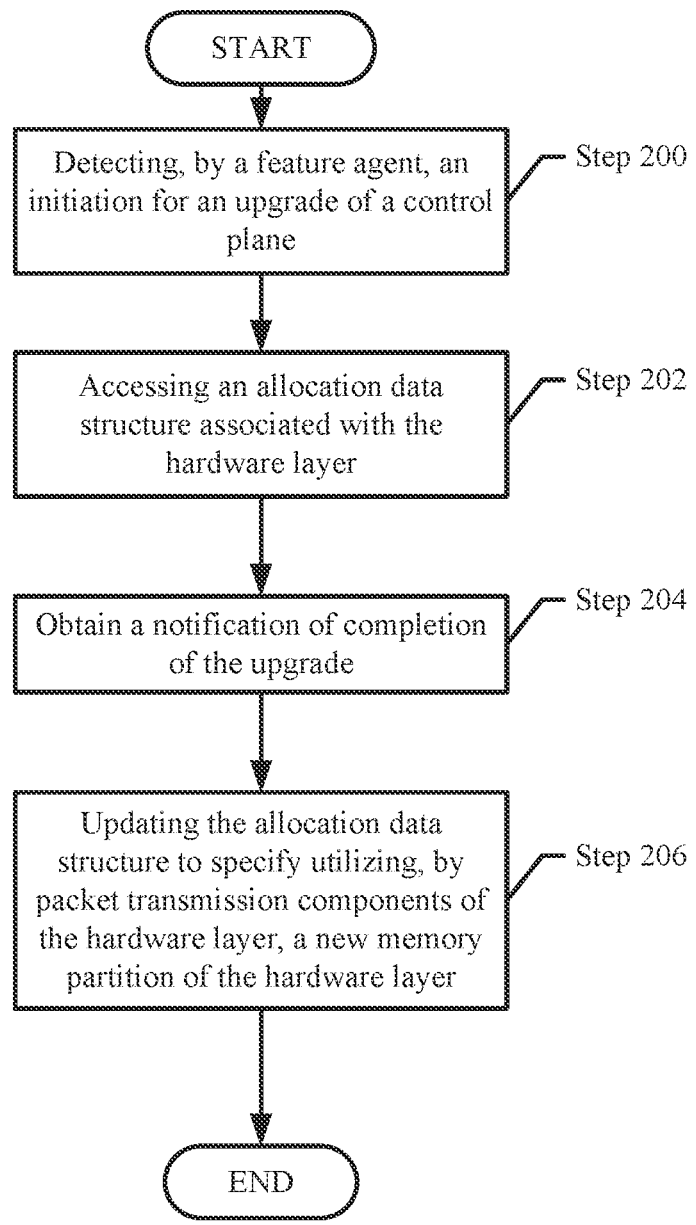
FIG. 2A shows a flowchart for a method for managing memory portions in accordance with one or more embodiments.
Figure 2B:
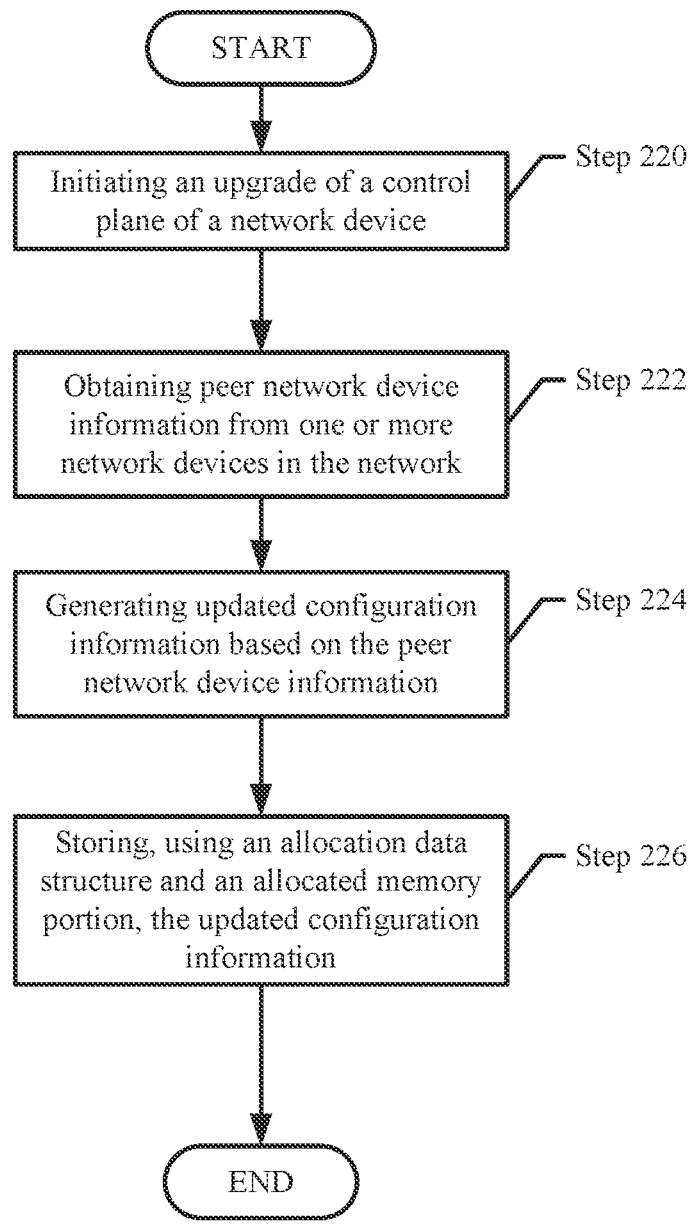
FIG. 2B shows a flowchart for a method for performing an upgrade on a control plane in accordance with one or more embodiments.

In one or more embodiments disclosed herein, the feature agent (136) is implemented as computer instructions (e.g. computer code) stored on a persistent storage that when executed by a processor of the network device (130) cause the network device (130) to provide the functionality of the feature agent (136) described throughout this application and/or all or a portion of the methods illustrated in FIG. 2B.

In one or more embodiments, the hardware layer (140) includes packet transmission components (142), and memory portions (152). In one or more embodiments, the hardware layer (140) includes at least two memory portions (e.g., memory portion A (154) and memory portion B (156)). The memory portions may be a set of memory banks that are logically grouped in accordance with the feature agent (136). For example, the allocation data structure (138), managed by the feature agent (136), may specify each of the logical groupings of memory banks.

In one or more embodiments, the memory banks are implemented as physical devices. The physical devices may provide functionality for providing memory functionality. The memory functionality may be volatile or non-volatile without departing from this disclosure.

In one or more embodiments, the packet transmission components (142) include functionality for obtaining packets from physical interfaces (e.g., ingress ports) and transmitting the obtained packets. The packet transmission components (142) may be implemented as, for example, forwarding chips. The forwarding chips may utilize forwarding tables of the network device (130) to determine which network devices to forward the obtained packets. The forwarding tables may be stored in, for example, one of the memory portions (154, 156) in accordance with instructions provided by the feature agent (136). For example, the feature agent may provide instructions that specify reading from (and/or writing to) the forwarding tables stored in memory portion A (154). The packet transmission components (152) may follow such instructions.

In one or more embodiments disclosed herein, the packet transmission components (142) are physical devices. The physical devices may be, for example, a field-programmable gate array, application specific integrated circuit, programmable processor, microcontroller, digital signal processor, or other hardware processor. The physical device may be adapted to provide the functionality of the packet transmission components (142) described throughout this application and/or in the method described in FIG. 2A.

FIG. 2A shows a flowchart of a method for managing packets at a hardware layer in accordance with one or more embodiments. The method of FIG. 2A may be performed by, for example, a network device (e.g., 130, FIG. 1B). Other components illustrated in FIGS. 1A-1B may perform the method of FIG. 2A without departing from the disclosure. Further, one or more steps in FIG. 2A may be performed concurrently with one or more steps in FIGS. 2A-2C.

While the various steps in the flowchart shown in FIG. 2A are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In step 200, a feature agent detects an initiation of an upgrade of a control plane. In one or more embodiments, the initiation is detected based on a communication between the feature agent and the network device agent performing the upgrade. For example, the network device agent may send a notification to the feature agent that specifies the upgrade. The upgrade may include updating state information of the network device and/or configuration information used to generate network device tables.

In step 202, an allocation data structure associated with the hardware layer is accessed. In one or more embodiments, the allocation data structure is accessed to determine a memory portion to be used by the network device agent for the download of configuration information in accordance with the upgrade. The allocation data structure may specify the memory portions currently in use by the packet transmission components for transmitting packets. Based on the specified memory portions that are in use, the feature agent may identify a memory portion that is not currently in use by the packet transmission components and communicate the identified memory portion to the network device agent. The feature agent may specify that the network device agent is to use the identified memory portion to complete the upgrade.

In step 204, a notification of completion of the upgrade is obtained. The notification may be obtained from the network device agent. The completed upgrade may include downloaded configuration information stored in the identified memory portion discussed in step 202. The downloaded configuration information may include, for example, an updated network device table used for transmitting packets by the packet transmission components.

In step 206, the allocation data structure is updated to specify utilizing, by the packet transmission component of the hardware layer, a new memory partition of the hardware layer. The new memory portion may be the identified memory portion of step 202 that stores the updated configuration information generated following the completion of the upgrade. The feature agent may instruct the packet transmission component to read from the new memory portion for future packet transmissions.

FIG. 2B shows a flowchart of a method for processing a packet in accordance with one or more embodiments. The method of FIG. 2B may be performed by, for example, a network device (e.g., 130, FIG. 1C). Other components illustrated in FIGS. 1A-1B may perform the method of FIG. 2B without departing from the disclosure. Further, one or more steps in FIG. 2B may be performed concurrently with one or more steps in FIGS. 2A-2C.

While the various steps in the flowchart shown in FIG. 2B are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In step 220, an upgrade of a control plane of a network device is initiated. In one or more embodiments, the upgrade of the control plane is initiated in response to a user, e.g., an administrator, sending a request to the network device for the upgrade. Alternatively, the upgrade may be initiated in response to an implemented upgrade policy that specifies a schedule for performing the upgrade. The upgrade may be initiated in response to other factors without departing from this disclosure.

In one or more embodiments, a network device agent performing the upgrade may communicate with the feature agent in accordance with FIG. 2A to identify an allocated memory portion to be used for downloading the updated configuration information generated during the upgrade.

In step 222, peer network device information is obtained from one or more network devices in the network. In one or more embodiments, the network device agent performing the upgrade may send information requests to each peer network device to obtain the peer network device information. The peer network device information may specify the direct connections of the peer network devices to other network devices in the network. The peer network device information may further include forwarding information associated with the forwarding of packets by the peer network devices. Such direct connections may be specified with the corresponding egress ports and ingress ports. The direct connections may be specified using their respective MAC and/or IP addresses.

In step 224, updated configuration information is generated based on the peer network device information. In one or more embodiments, the update configuration information is generated by calculating the routes to be used during the packet transmission between network paths in the network. The calculated routes may be processed to generate forwarding information to be used by the packet transmission components during packet transmission. The forwarding information may be included in the updated configuration information as a forwarding table.

In step 226, the updated configuration information is stored using an allocated memory portion. In one or more embodiments, as discussed above, the updated configuration information may include network device tables (e.g., forwarding tables).

Figure 2C:
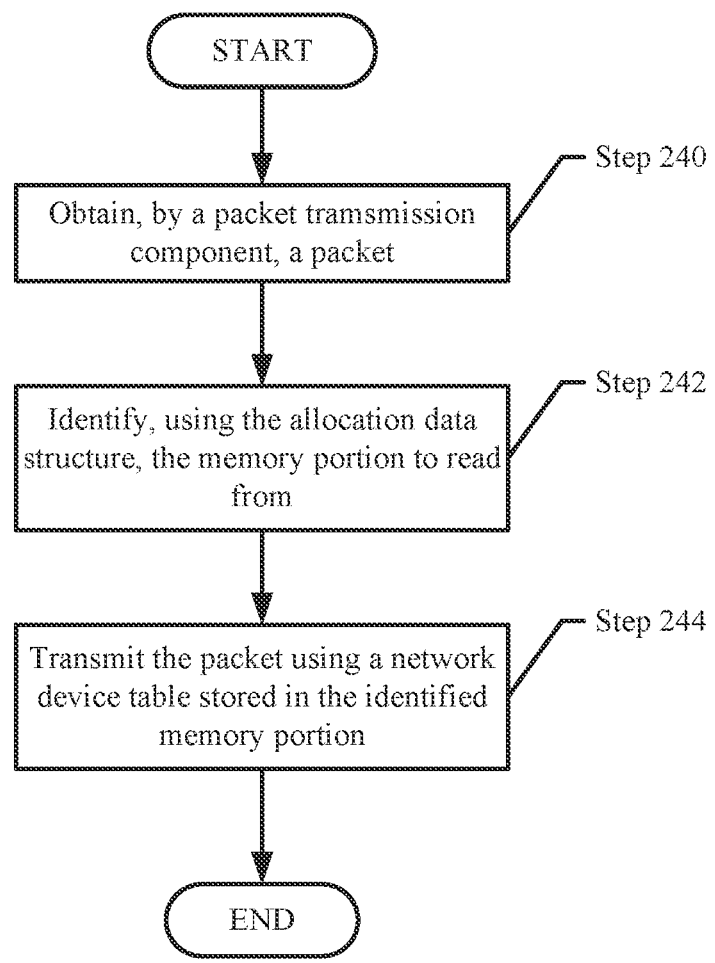
FIG. 2C shows a flowchart for a method for performing an upgrade on a control plane in accordance with one or more embodiments.

FIG. 2C shows a flowchart for performing an upgrade on a control plane in accordance with one or more embodiments. The method of FIG. 2C may be performed by, for example, a network device (e.g., 130, FIG. 1B). Other components illustrated in FIGS. 1A-1B may perform the method of FIG. 2C without departing from the disclosure. Further, one or more steps in FIG. 2C may be performed concurrently with one or more steps in FIGS. 2A-2C.

In step 240, a packet is obtained by a packet transmission component. The packet transmission component may obtain the packet from a second network device in the network. The packet may be travelling along a network data path.

In step 242, the allocated memory portion is identified. In one or more embodiments, the allocated memory portion is identified based on a communication with the feature agent. The communication may be such communication discussed in FIG. 2A. The identified memory portion may include any number of memory banks.

In step 244, the packet is transmitted using a network device table stored in the identified memory portion. In one or more embodiments, the network device table is a forwarding table. The packet transmission component may read the header of the packet to identify a destination address and/or a next hop address. For example, the header may include an IP address. The packet transmission component may utilize the specified IP address to determine the egress interface to utilize to send the packet. The destination address and/or the next hop address may be read against the forwarding table to identify the network device to send the packet. The forwarding chip may initiate the transmission of the packet to the network device via the identified egress interface.

EXAMPLE

Figure 3A:
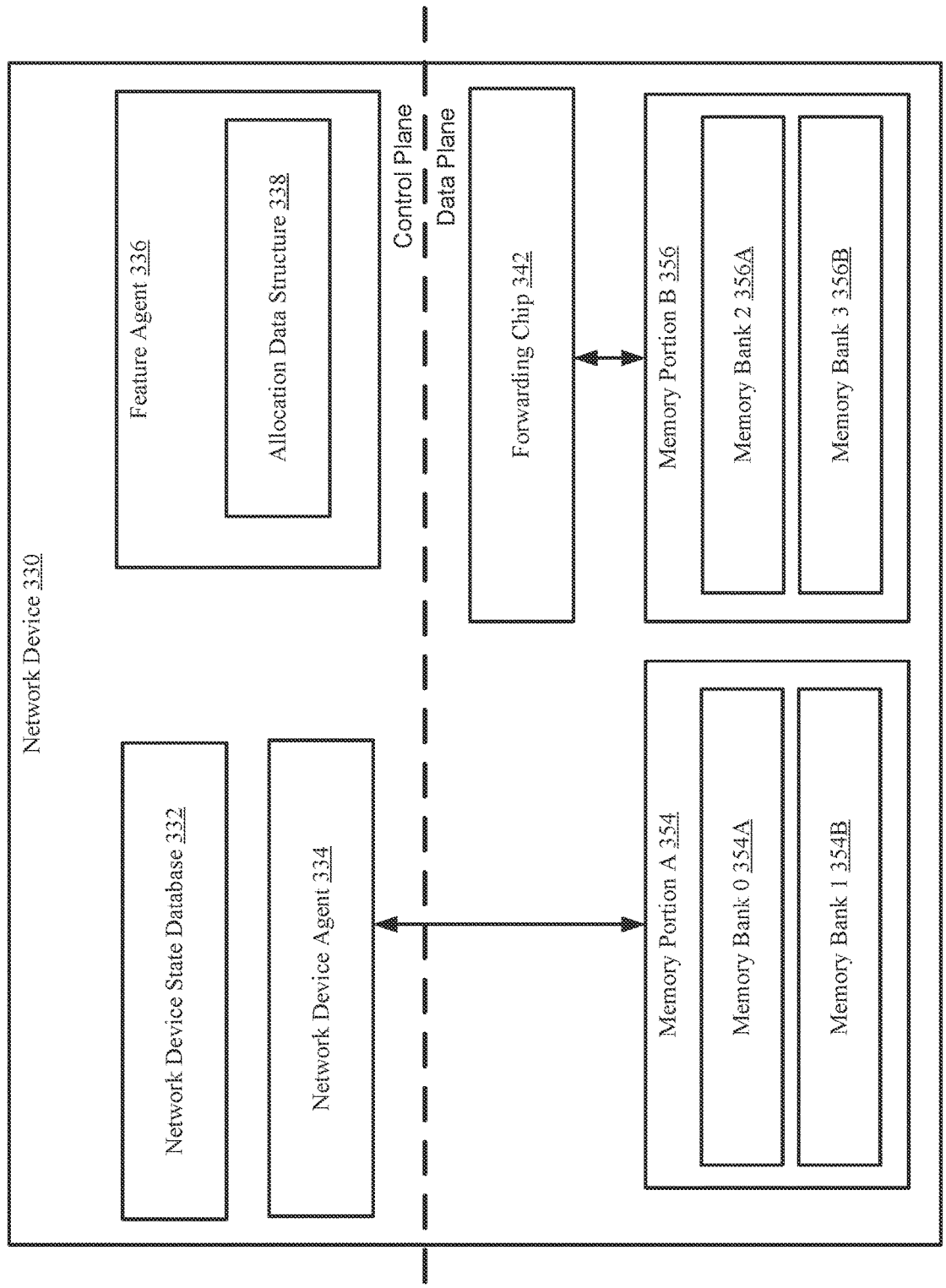
FIGS. 3A-3B show an example in accordance with one or more embodiments described herein.
Figure 3B:
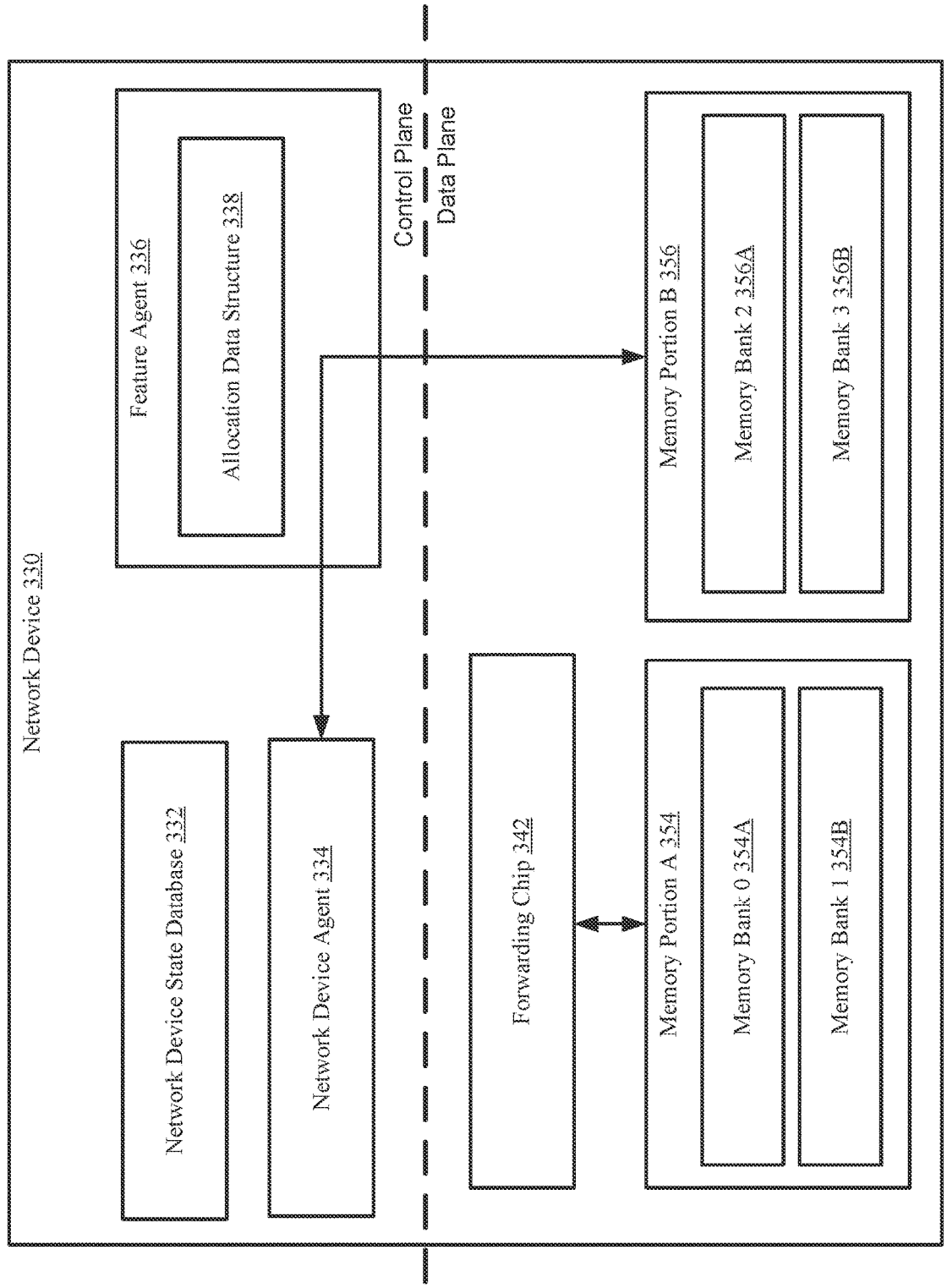

This section describes an example in accordance with one or more embodiments. The example is not intended to limit the scope of this disclosure. Turning to the example, FIGS. 3A-3B shows an example in accordance with one or more embodiments. The example shows a network device (330) that includes a network device agent (334) that initiates and manages an upgrade of the network device (330). The network device (330) further includes a feature agent (336) that manages an allocation data structure (338). The network device agent (334) and the feature agent (336) may be found in the control plane of the network device (330). The hardware layer of the network device (330) includes a forwarding chip (342) and two memory portions (memory portion A (354) and memory portion B (356)). Memory portion A (354) includes memory bank 0 (354A) and memory bank 1 (354B). Memory bank B (356) includes memory bank 2 (356A) and memory bank 3 (356B).

At the hardware layer, a forwarding table is stored in memory portion B (356). The forwarding chip (342), at a first point in time, utilizes the forwarding table in memory portion B (356) to forward packets and to store entries corresponding to packet forwarding. At a second point in time, the network device agent (334) initiates an upgrade of the network device (330). The upgrade includes obtaining and initiating implementation of a new version of software for the control plane. The upgrade may include updating the forwarding table based on updated state information stored in a network device state database (332). The state information is updated by performing peer communication with network devices directly connected to the network device (330) to determine routing information between the network device (330) and other devices in the network (not shown). The network device agent (334) performing the upgrade may communicate with the feature agent (336) to determine the memory portion to be used for downloading the updated forwarding table to the hardware layer. The feature agent (336), using the allocation data structure (338), identifies memory portion A (354) as the memory portion to be used by the network device agent (330). The identified memory portion (354) is communicated with the network device agent (334). The updated forwarding table is downloaded to memory portion A (354).

During the download, the forwarding chip (342) continues to forward packets using memory portion B (356). In this manner, the upgrade does not cause a delay to the transmission of packets.

At a third point in time, the network device agent (334) provides, to the feature agent (336), a notification of completion of the download. The feature agent (336), in response to the notification, updates the allocation data structure (338) to specify the forwarding chip (342) to read from memory portion A (354), and for memory portion B (356) to be free for use for future upgrades by the network device agent (334).

FIG. 3B shows a diagram of the example network device. At a fourth point in time, the forwarding chip (342) obtains instructions from the feature agent (336) that specifies utilizing the updated forwarding table on memory portion A (354) for packet transmission. The forwarding chip (342), in response to the instructions, forwards the packets in accordance with the updated forwarding table stored in memory portion A (354).

Further, when a new upgrade is initiated by the network device agent (334), the network device agent (334) may communicate with the feature agent (336) to determine the memory portion to be used for downloading a new updated forwarding table. The feature agent (336), using the allocation data structure (338), identifies memory portion B (356) as the portion of memory to be used for downloading the new updated forwarding table.

End of Example

Providing a smaller scale of resources such as memory portions from which the packet transmission components read network device tables reduces the outage time caused by an upgrade to the state of the network device. By providing multiple portions of memory in the hardware layer, embodiments disclosed herein allow the network device to continue to transmit packets using one portion of memory while a second portion is used to upgrade the information useful to the network device for the transmission of future packets. A seamless transition from the first portion of memory to the second portion of memory following completion of the upgrade may provide a low latency of a recently upgraded network device. Such improvement may improve the overall operation of the network device.

Specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase connected, or connection, means that there exists between elements/components/devices a direct or indirect connection that allows the elements to interact with one another in some way. For example, the phrase 'connected' may refer to any direct (e.g., wired directly between two devices or components) or indirect (e.g., wired and/or wireless connections between any number of devices or components connecting the connected devices) connection. Thus, any path through which information may travel may be considered a connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing a network device, the method comprising:

accessing, by a feature agent of the network device, an allocation data structure, wherein the allocation data structure specifies a first portion of memory for use during an upgrade of the network device and a second portion of memory that stores a network device table for packet transmission;

identifying, using the allocation data structure, the first portion of the memory to be used during the upgrade;

performing the upgrade at least in part by populating the first portion of memory with a second network device table, wherein the network device table is used by a packet transmission component while the upgrade is being performed;

upon completion of the upgrade, updating the allocation data structure to specify that the packet transmission component use the second network device table and stop using the network device table and to specify the second portion of memory for use for a future upgrade.

2. The method of claim 1, wherein the packet transmission component is in a hardware layer of the network device.

3. The method of claim 2, wherein the first portion of memory and the second portion of memory operate on the hardware layer.

4. The method of claim 1, wherein the upgrade is performed in a control plane of the network device.

5. The method of claim 4, wherein the forwarding chip is an application-specific integrated chip (ASIC).

6. The method of claim 1, wherein the packet transmission component is a forwarding chip.

7. The method of claim 1, further comprising:
notifying a network device agent of the first portion of memory, wherein the network device agent performs the upgrade.

8. The method of claim 1, wherein the network device table is a forwarding table.

9. A network device, comprising:
a hardware layer comprising a first portion of memory and a second portion of memory;
a control plane; and
a feature agent located in the control plane and programmed to:
access an allocation data structure, wherein the allocation data structure specifies the first portion of memory and the second portion of memory;
identify, using the allocation data structure, the first portion of memory to be used during an upgrade performed by the control plane, wherein the second portion of memory is used for storing a network device table, wherein the network device table is used by a packet transmission component of the hardware layer while the upgrade is being performed; and
upon completion of the upgrade, update the allocation data structure to specify that the packet transmission component use a second network device table in the first portion of memory and stop using the network device table, wherein the second network device table is initially populated during the upgrade, wherein, prior to the completion of the upgrade, the allocation data structure specifies the first portion of memory for completing the upgrade and the second portion of memory for use by the packet transmission component, and wherein, after the completion of the upgrade, the allocation data structure specifies the second portion of memory for completing a future upgrade and the first portion of memory for use by the packet transmission component.

10. The network device of claim 9, wherein the packet transmission component is a forwarding chip.

11. The network device of claim 10, wherein the forwarding chip is an application-specific integrated chip (ASIC).

12. The network device of claim 9, further comprising:
notifying a network device agent of the first portion of memory, wherein the network device agent performs the upgrade.

13. The network device of claim 9, wherein the network device table is a forwarding table.

14. A method for managing a network device, the method comprising:
accessing, by one or more processors of the network device, an allocation data structure, wherein the allocation data structure specifies a first portion of memory and a second portion of memory;
identifying, using the allocation data structure, the first portion of memory to be used during an upgrade, wherein the second portion of memory is used for storing a forwarding table, wherein the forwarding table is used by a packet transmission component while the upgrade is being performed;
performing, by the one or more processors of the network device, an upgrade of the network device that populates the first portion of memory with a second forwarding table, wherein the second forwarding table is a new iteration of the forwarding table; and
upon completion of the upgrade, updating, by the one or more processors of the network device, the allocation data structure to specify that the packet transmission component use the second forwarding table in the first portion of memory for transmitting packets and stop using the forwarding table in the second portion of memory, wherein, prior to the completion of the upgrade, the allocation data structure specifies the first portion of memory for completing the upgrade and the second portion of memory for use by the packet transmission component and wherein, after the completion of the upgrade, the allocation data structure specifies the second portion of memory for completing a future upgrade and the first portion of memory for use by the packet transmission component.

15. The method of claim 14, wherein the packet transmission component is in a hardware layer of the network device.

16. The method of claim 15, wherein the first portion of memory and the second portion of memory operate on the hardware layer.

17. The method of claim 14, wherein the one or more processors form a control plane of the network device.

18. The method of claim 14, wherein the packet transmission component is a forwarding chip.

19. The method of claim 18, wherein the forwarding chip is an application-specific integrated chip (ASIC).

* * * * *